United States Patent Office.

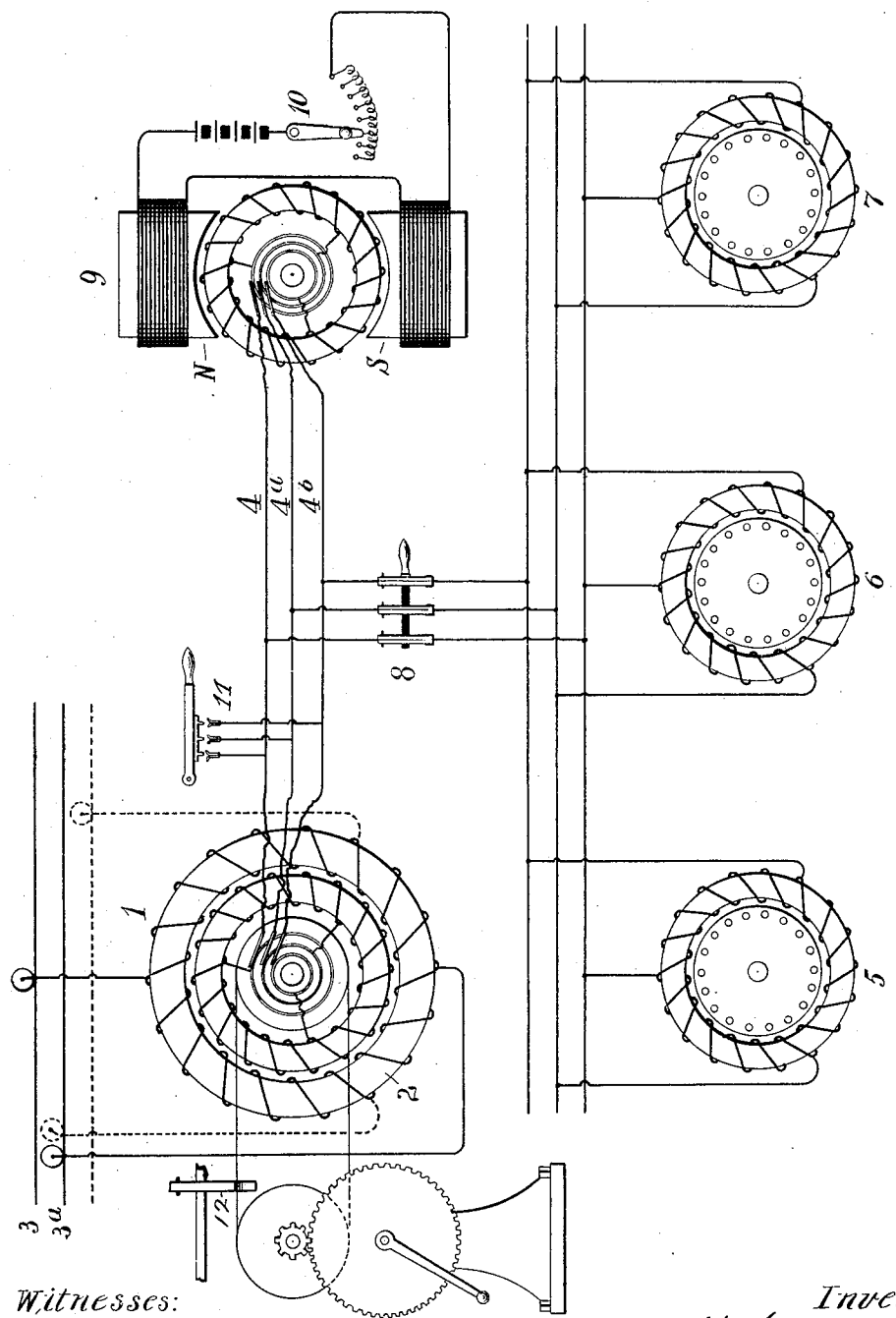

CHARLES S. BRADLEY, OF AVON, NEW YORK.

METHOD OF AND APPARATUS FOR ELECTRICALLY TRANSMITTING POWER.

SPECIFICATION forming part of Letters Patent No. 615,673, dated December 13, 1898.

Application filed July 14, 1897. Serial No. 644,474. (No model.)

*To all whom it may concern:*

Be it known that I, CHARLES S. BRADLEY, a citizen of the United States, and a resident of Avon, county of Livingston, State of New York, have invented certain new and useful Improvements in Methods of and Apparatus for Electrically Transmitting Power, of which the following is a specification.

This invention relates to the transmission of power by alternating electric currents, the object being to permit alternating-current motors to have their speed and torque varied by supplying them with currents of variable frequency, said currents being derived from a supply-circuit of definite frequency.

The invention is particularly adapted to the operation of a plurality of motors mounted on a car or a train of cars, the energy being derived from a simple alternating-current circuit of single phase extending along the railway-line.

In carrying out the invention I provide at or near the point where the motors are to be operated—as, for example, on a railway-train—a motor-generator or rotary transformer the generating member of which supplies polyphase currents and the magnetizing member of which has its windings connected with a single-phase supply-circuit, and with the polyphase generating-circuit I connect in parallel the series or group of motors which constitute the driving equipment of the train. In parallel relation to the motors I connect a free-running machine the armature of which is connected with the polyphase circuit and the field-magnet of which is magnetized by a direct current the strength of which may be varied to vary the field-magnet strength. With an organization of this character I find that the free-running direct-current-charged machine acts in the same manner as a condenser and that by adjusting the field-magnet strength the armature will react upon the motor-generator and produce a variable slip between its primary and secondary. Either the motor-generator or the free-running direct-current-charged motor may be provided with a starting device—such, for example, as the hand-operated starting device shown in connection with the motor-generator in the drawing—by which the apparatus may be thrown into operation. By closing the switch 10 and adjusting it so as to give the field-magnet a strong charge the motor-generator then assumes a high speed, the slip being small. The work-circuit being closed, a strong torque is developed on the motor-armatures and the conditions are best for starting under load by reason of the slow rotary magnetic fields set up by their magnetizing-windings. The regulating-switch of the direct-charged machine may be then shifted so as to weaken its field-magnetism, thereby creating a greater slip in the motor-generator and increasing the rate of alternation in the work-circuit, accordingly increasing the speed of the working motors. The direct-charged machine acts in the same manner as a capacity in the work-circuit and by its compensating action on the inductance of said circuit controls the rate of alternation, the motor-generator accommodating itself to a speed to produce electric resonance in the primary circuit.

My invention therefore involves an alternating-current system comprising a motor-generator capable of developing an alternating current and a machine in circuit therewith to control the rate of the secondary current having a direct-charged field-magnet and means for varying the field-magnet strength.

It comprises also an alternating-current system and means for varying the frequency, comprising a motor-generator for delivering alternating currents and a free-running machine having a direct-current-charged field-magnet and means for varying the strength of the field.

It comprises also other features the novelty of which will be hereinafter fully described and will be definitely indicated in the claims appended to this specification.

In the accompanying drawing, which illustrates the invention, is shown diagrammatically a system embodying my improvements.

1 represents a motor-generator one element of which is magnetized by a current from a supply-circuit 3 3$^a$. The supply-circuit may be of any desired character. As shown in full lines, it may furnish single-phase currents. The secondary winding of the motor-generator is tapped at symmetrical points, and connections are led to a distribution or work circuit 4 4$^a$ 4$^b$, which supplies a series of motors 5 6 7. The motors may be of any approved type. The system indicated is particularly adapted for the simultaneous operation of a group of motors to actuate a railway-train, all of the motors being controlled by a single switch 8. In order to increase the starting torque of the motors and to regulate their speed, I provide means for varying the frequency of the current delivered by the motor-generator. This device comprises a free-running machine 9 of the character commonly called "synchronous," the armature of which is connected with the secondary of the motor-generator and the field-magnet charged by a direct current, so as to develop poles of constant polarity N S. The field-magnet may be charged by any source of direct current, the strength of charge being regulated by a switch for cutting in or out resistance. By varying the field-magnet charge the inductance of the motor system may be more or less neutralized, and the strength of current is greater accordingly as the neutralization is more or less perfect. The rotary member of the motor-generator assumes a different speed for each adjustment of the field-magnet strength, and accordingly the frequency of the work-circuit and the speed of the driven motors are varied by adjusting the field-magnet strength. In starting up, the field magnetism of machine 9 should be given a maximum strength, thereby establishing a maximum capacity in the motor system or work-circuit, under which in accordance with the well-known formula for electrical resonance ($K \times L = 25,000 \div R^2$) the frequency should be lowest, K representing the capacity in microfarads, I the inductance in henries, and R the rate of alternation. The armature of the motor-generator therefore maintains a high speed, permitting a small slip between its poles and the poles of its coöperating rotary field. The low frequency is especially advantageous for starting the induction-motors 5 6 7 by developing a slow-speed rotary magnetic field in their magnetizing-windings. The motors therefore start with strong torque. After getting under way their speed may be accelerated by adjusting switch 18 so as to reduce the field-magnet strength of the machine 9, thereby slowing down the revolving member of the motor-generator and increasing the strength of the currents it supplies to the work-circuit. Thus by graduating the strength of the machine 9 the rate of alternation in the work-circuit may be made anything desired and the motors brought to any required speed. It will of course be understood that although for practical service a single-phase supply-circuit is preferred a polyphase circuit might be employed. In the latter case more than two connections with the magnetizing-winding of the motor-generator should be made, as indicated in dotted lines in the diagram, and a short-circuiting switch for the secondary of the motor-generator should be employed, as indicated at 11, to short-circuit the motor-generator and permit it to start up. In either case a rotary field is developed by the magnetizing-winding. In case a single-phase supply-circuit be employed either the motor-generator or the machine 9 should be provided with a starting device, which may be a crank-operated belt, as indicated. A belt-shifter 12 may be used to shift the belt to a loose pulley after the system is in operation. It is sufficient for either of the machines to be started, since when the system is once under way the polyphase currents of the work-circuit react upon the magnetizing-winding of the motor-generator, so as to set up a rotary magnetic field. A single-phase supply-current will then maintain the system in operation.

Having thus described my invention, what I claim as new, and desire to secure by Letters Patent, is—

1. An alternating-current system comprising an alternating-current source, a motor-generator supplied thereby, a work-circuit supplied with alternating currents by said motor-generator, a machine having its armature supplied from the work-circuit and its field-magnet charged by a direct current, and means for varying the capacity of the work-circuit by varying the strength of the field-magnet charge, thereby altering the frequency of the work-current.

2. An alternating-current system comprising an alternating-current source, a motor-generator supplied thereby, a work-circuit supplied by alternating currents by the motor-generator, a frequency-determining machine having its armature supplied from the work-circuit and its field-magnet charged by a direct current, means for varying the field-magnet charge, and induction-motors in the work-circuit.

3. The method of altering the rate of an alternating current consisting in leading said current through a motor-generator, feeding an armature from the secondary of said generator, and varying the strength of the field-magnetism coöperating with the armature to adjust the capacity of the circuit to the required rate.

In testimony whereof I have hereunto subscribed my name this 21st day of June, A. D. 1897.

CHARLES S. BRADLEY.

Witnesses:
C. R. WATERBURY,
ROBT. H. READ.